(12) United States Patent
Bolgar et al.

(10) Patent No.: US 8,613,293 B2
(45) Date of Patent: Dec. 24, 2013

(54) INSERTION TO A SINGLE-GRIP, ROTATION-OPERATED MIXING FAUCET

(75) Inventors: Gyorgy Bolgar, Budapest (HU); Tamas Szarvas, Budapest (HU)

(73) Assignee: Kerox Ipari es Kereskedelmi Kft., Diosd (HU)

( * ) Notice: Subject to any disclaimer, the term of this patent is extended or adjusted under 35 U.S.C. 154(b) by 646 days.

(21) Appl. No.: 12/458,447

(22) Filed: Jul. 13, 2009

(65) Prior Publication Data

US 2010/0006169 A1 Jan. 14, 2010

(30) Foreign Application Priority Data

Jul. 14, 2008 (HU) .................................... 0800431

(51) Int. Cl.
*F16K 11/16* (2006.01)
(52) U.S. Cl.
USPC ........................ 137/625.46; 137/898; 137/597
(58) Field of Classification Search
USPC .................................... 137/597, 898, 625.46
See application file for complete search history.

(56) References Cited

U.S. PATENT DOCUMENTS

| 4,653,538 | A | * | 3/1987 | Tsutsui et al. | 137/625.46 |
|---|---|---|---|---|---|
| 5,441,075 | A | * | 8/1995 | Clare | 137/454.6 |
| 5,896,601 | A | * | 4/1999 | Humpert et al. | 4/677 |
| 6,386,233 | B1 | * | 5/2002 | Magocsi | 137/625.17 |
| 8,109,292 | B2 | * | 2/2012 | Bolgar et al. | 137/625.17 |
| 2006/0162793 | A1 | * | 7/2006 | Di Nunzio | 137/625.46 |

* cited by examiner

*Primary Examiner* — Eric Keasel
*Assistant Examiner* — Daphne M Barry

(57) ABSTRACT

A control unit for a rotation mixing faucet. The control unit has a base on one side and is connected to an operating arm on the other side. The control unit includes a stationary inlet disc and a rotatable control disc. The inlet disc is connected to the base, and the control disc is connected to the operating arm such that the operating arm rotates the control disc relative to the inlet disc. The inlet disc includes a hot water inlet, a cold water inlet, and first and second outlets, wherein the operating arm independently controls the first and second outlets to adjust water temperature and to switch operation between the first and second outlets without controlling the quantity of water flow by rotating the control disc in a single degree of freedom so that water can only flow out of one of the outlets at a time.

6 Claims, 6 Drawing Sheets

INSERTION TO A SINGLE-GRIP, ROTATION-OPERATED MIXING FAUCET

BACKGROUND OF THE INVENTION

Field of the Invention

The invention relates to an insertion to a single-grip mixing faucet in which two outlets can be controlled independently by an adjustable arm.

SUMMARY OF THE INVENTION

Thus the invention relates to an insertion piece applied in a so-called rotation-operated mixing faucet operated by a single-grip rotation arm, in which the water of a required temperature is produced by mixing cold and hot water in an appropriate proportion. For controlling the temperature of the water flowing through the faucet, a control unit comprising a ceramic disc, the so-called cartridge is built in. The control unit proper comprises a fixed inlet disc and an adjustable control disc. The inlet disc and the control disc are arranged one above the other to form a plane sealing. The face of the control disc being away from to the inlet disc is in a forced connection with the operating arm of the faucet and the operating arm being adjustable in a certain range around the vertical axis of the faucet. The inlet disc is placed onto a base containing the inlet and outlet ports. One of the inlet ports is connected to the cold water network, the other one to the hot water network, and via the outlet port, the water of a required temperature determined by the two ceramic discs leaves the cartridge. The amount of the water flowing through cannot be regulated. Mixing faucets provided with such control unit are suitable for use in lavatory-basins and sinks. However, armatures used for filling bathtubs are almost always provided with a shower rose, thus they should contain also a supplementing switching valve. These switching valves are, however, used up very quickly due to the deposition of scale crust, thus they require regular maintenance. A further drawback is that the proper development of switching valves in the metal housing of the faucet means additional cost for the manufacturers.

The objective of this invention is to develop a cartridge of a new system, i.e. a control unit with ceramic discs, allowing independent control of two separate outlets by a single adjustable arm without using any switching valve. This is performed so that the cartridge involves also the function of switching to the shower function simplifying thus the development and handling of the bath-filling and shower armature.

The recognition of the invention is that besides the inlet ports for the cold and hot water, two outlet ports are developed. One of the outlet ports is the outlet for the bathtub, whereas the other one is for the shower. Opening and closing of the ports are realized by using two ceramic discs being similar to those used in traditional rotational cartridges.

Thus, the invention relates to insertion piece for a single-grip mixing faucet developed as a control unit with ceramic discs and being connected on its one side to a base, and on the other side to an operating arm. The control unit itself, the so-called cartridge, comprises a stationary fixed inlet disc and a adjustable control disc arranged one above the other to form together a plane sealing, the other side of the inlet disc is connected to a base, whereas the regulating disc, on its opposite side to the inlet disc, is in a forced connection with an operating arm, and the base contains an inlet for hot water, and an inlet and an outlet.

The essence of the invention consists in the construction that the base is provided with at least one inlet port for the hot water, at least one inlet port for the cold water, but at least two outlet ports, and the operating arm also comprises at least two separate outlets, preferably one for bathtub filling and one for the shower function, to be controlled independently and to be switched at least towards the two outlets.

One of the preferred embodiments of insertion piece of the faucet according to the invention is developed so that at operation towards one of the outlets the mixing ratio of the cold and hot water, i.e. the temperature of the water flowing out is regulated by turning the operating arm clockwise by an angle of β, at operation towards the other outlet, the temperature of the water flowing out, i.e. the mixing ratio of cold and hot water can be regulated by turning the operating arm anti-clockwise by an angle of δ.

One of the outlets is preferably for filling the tub, the other one for operating the shower.

BRIEF DESCRIPTION OF THE DRAWINGS

In what follows, the invention is described in detail on the basis of the embodiment shown here as an example by means of the figures enclosed.

DETAILED DESCRIPTION OF THE INVENTION

Figure 1:
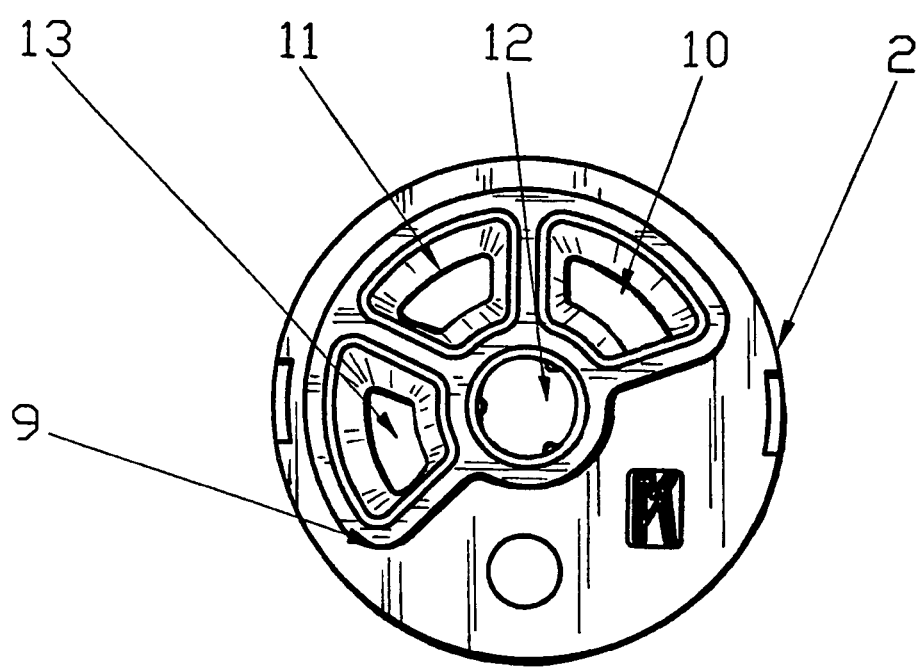
FIG. 1 is the bottom view of the inlet disc used in the cartridge according to the invention showing the inlet and outlet ports.

Describing now the figures in details, FIG. 1 shows the bottom view of the cartridge, i.e. its view from the direction of a base 2, where an inlet port 10 for the cold water, an inlet port 11 for the hot water, an outlet port 12 towards the bathtub and an outlet port 13 towards the shower can be seen. In addition, a profile seal 9 is also shown.

Figure 2:
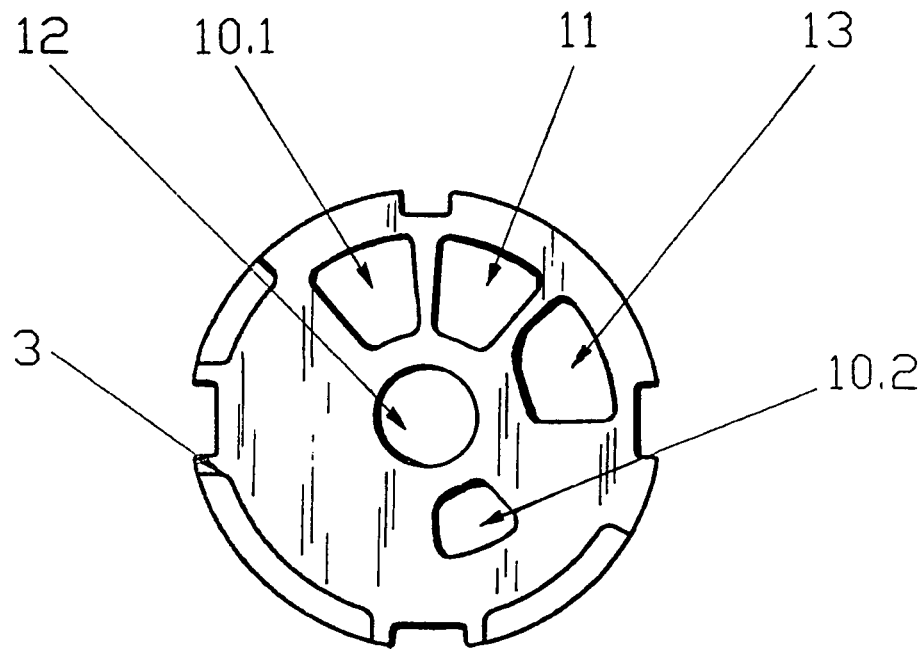
FIG. 2 is the top view of the inlet disc in the cartridge according to the invention used in an embodiment serving as an example.

FIG. 2 shows the top view of an inlet disc 3 made of ceramics in an embodiment serving as an example. The position of the each port can be seen, i.e. one inlet port 10.1 for the cold water towards the tub, and one inlet port 10.2 for the cold water towards the shower, the inlet port 11 for the hot water, the outlet port 12 towards the bathtub, and the outlet port 13 towards the shower.

Figure 3:
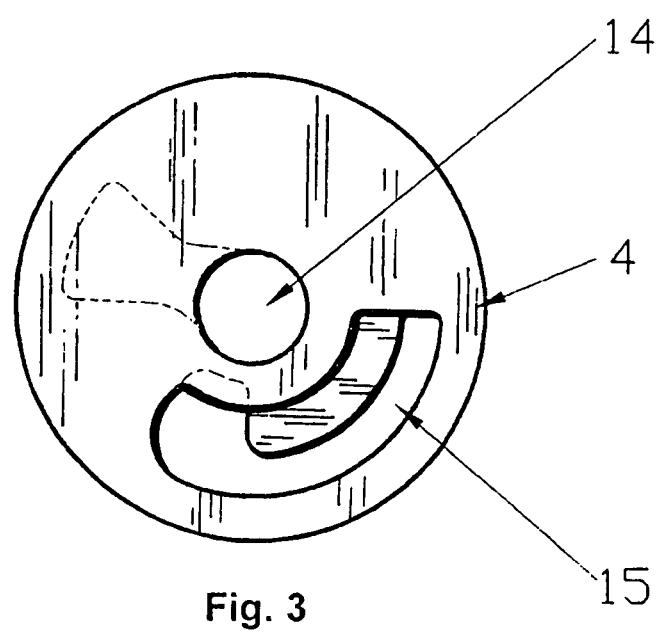
FIG. 3 shows the top view of the regulating disc in the cartridge according to the invention used in an embodiment serving as an example.

FIG. 3 shows the upper, adjustable control disc 4 made of ceramics together with a mixing space 14 for filling the tub, and a mixing space 15 for operating the shower.

Figure 4A:
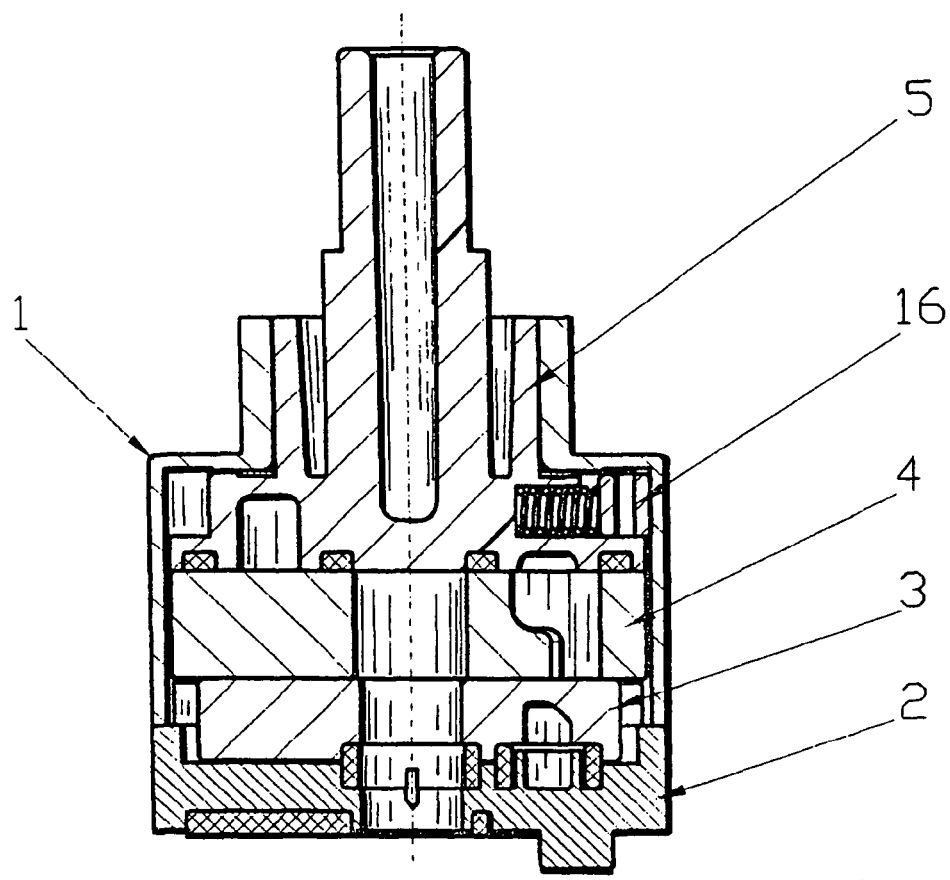
FIG. 4a illustrates the vertical section of the cartridge according to the invention used in an embodiment serving as an example.
Figure 4B:
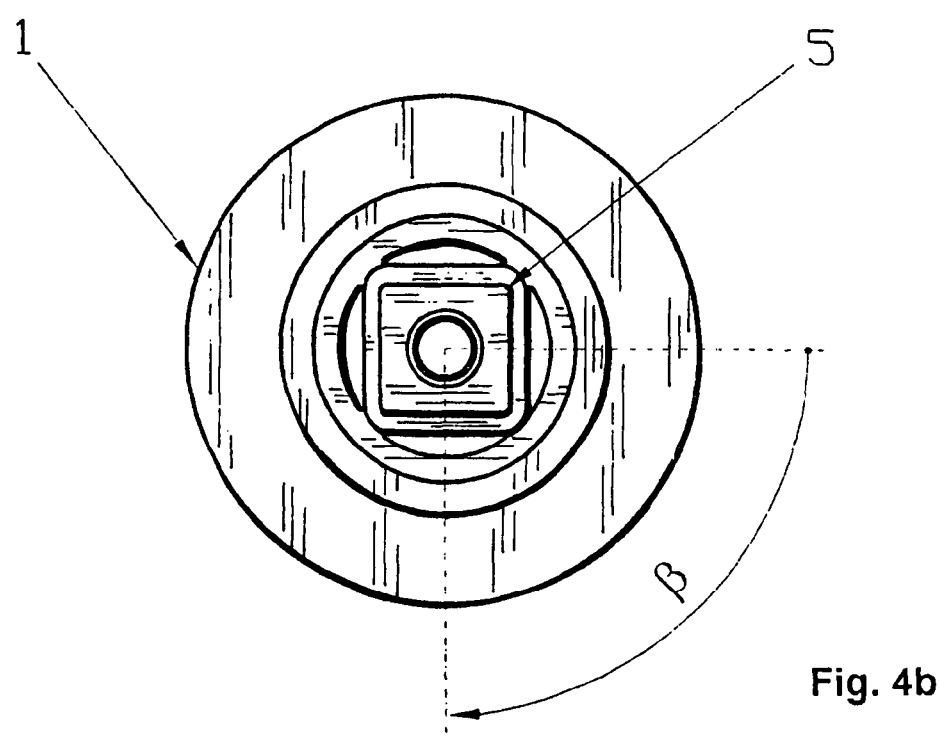
FIG. 4b is the top view of the cartridge according to the invention shown in FIG. 4a in its tub-filling position serving as an example.
Figure 5D:
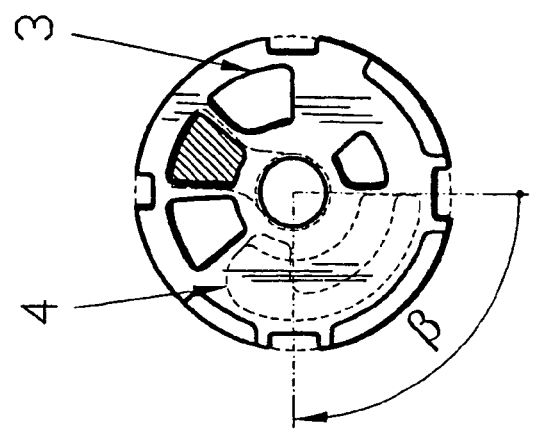
FIGS. 5a-5d show the process mixing cold and hot water and the positions of the two discs during mixing, in case of filling a tub
Figure 5C:
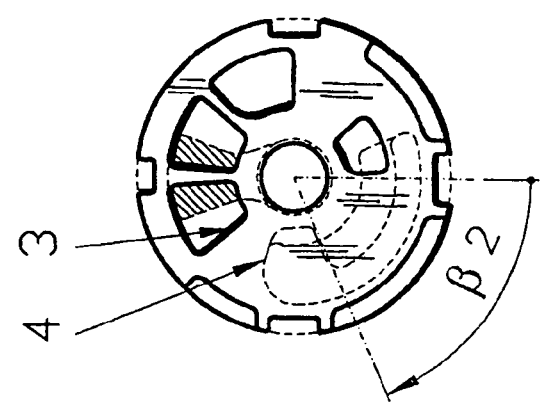
Figure 5B:
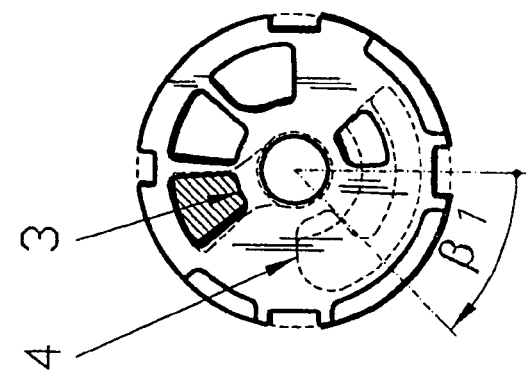
Figure 5A:
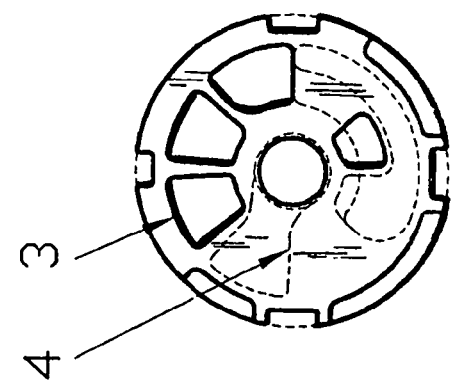

In order to ensure that the cartridge according to the invention would serve well the objective set, i.e. that two separate outlets (for the tub and the shower) could be operated by one single operating arm, the operating arm is developed so that it could be operated by switching it in two positions. One of these positions is illustrated in FIG. 4b, where the cartridge according to the invention is shown also in its vertical section in FIG. 4a. The cartridge comprises within its housing 1 the two ceramic discs, the inlet disc 3 and control disc 4 placed one above the other forming thereby a plane seal. The inlet disc 3 is arranged on base 2. The face of the control disc 4 being opposite to the inlet disc 3, is in a forced connection with the operating arm 5. A fixing element 16 provided with a spring is also in connection with operating arm 5. FIG. 4b shows the top view of the cartridge drawn in FIG. 4a.

FIG. 5 show the appropriate positions of the discs during operation. By turning the operating arm from its base position clockwise, inlet ports 10.1 for the cold water opens gradually up to the angle of $\beta 1$, then the inlet port 12 for hot water up to the angle of $\beta 2$, thus the temperature of the water flowing out increases. Turning at an angle of $\beta$, further movement is hindered by a bumper. In this case, only hot water flows to outlet 12.

By turning the arm back to its starting position, a fixing element 16 provided with a spring limits further rotation.

FIGS. 5a-5d illustrate the adjusting of the water temperature by operating arm 5 in its tub-filling position. It is seen that by adjusting angle $\beta$, the temperature of the water flowing out can be controlled.

Figure 6:
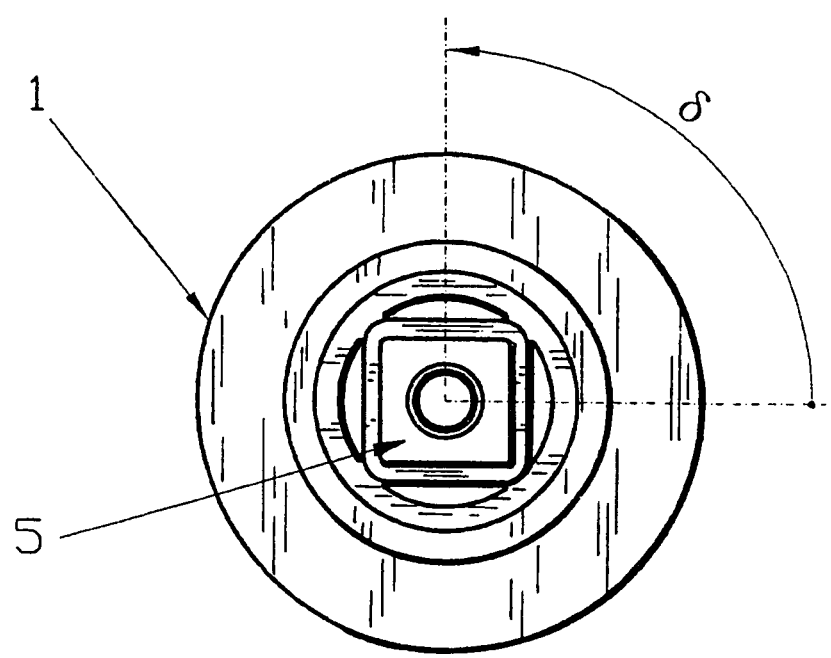
FIG. 6 shows the top view of the cartridge according to the invention operating in shower function in an embodiment serving as an example.
Figure 7D:
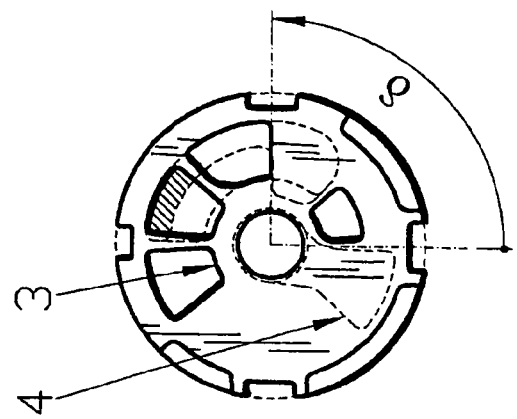
FIGS. 7a-7d illustrate the process of mixing cold and hot water by showing the positions of the two discs placed onto each other during mixing.
Figure 7C:
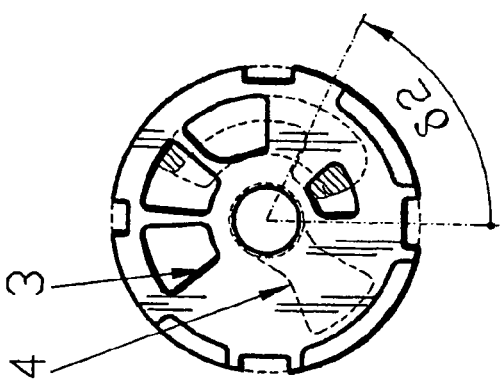
Figure 7B:
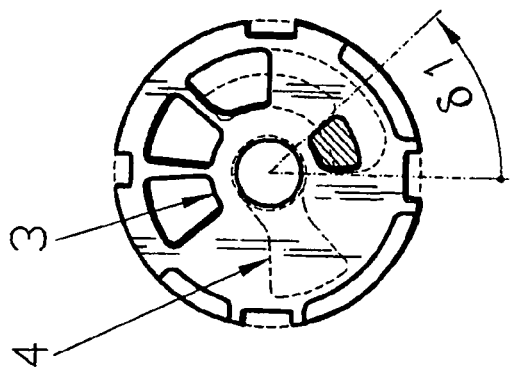
Figure 7A:
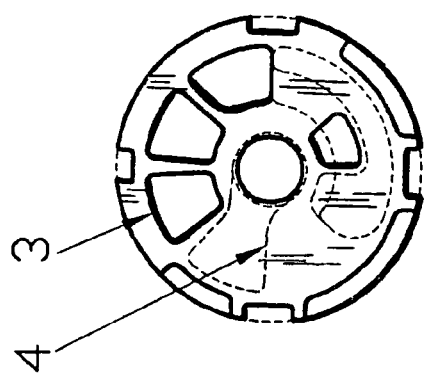

In FIG. 6, the cartridge according to the invention can be seen the other position of operating arm 5, in its shower function. Switching through between the two operation ranges is to be made by force, and the arm 5 can be turned anti-clockwise up to angle $\delta$ as well. In this case, the cartridge directs the water flow towards the outlet port 13 of the shower function. By this operation range the temperature of the water flowing through can be controlled by turning operating arm 5 to a proper angle $\delta$.

Flowing of the water is controlled by the smaller hole in the control disc 4, the mixing space 15, from inlet ports 10.2 for cold water, and inlet port 11 for hot water towards outlet port 13. Turning the operating arm 5 by an angle of $\delta$, ceramic control disc 4 opens first the way for cold water (up to an angle of $\delta 1$). At turning further, it opens also the inlet port 11 for hot water (angle $\delta 2$), up to angle $\delta$, where only hot water arrives at the outlet port 13 (FIGS. 7a-7d).

Closing of the outlet port 13 for shower occurs by turning back the arm to the base position. In this case, fixing element 16 provided with a spring helps to find the base position.

Thus, it is seen that by one single operating arm 5, which can be adjusted in two different positions and operated there, two separate outlets, bathtub-filling and shower operating outlets can be controlled independently, using of at least one inlet for hot water and one inlet for cold water.

The invention claimed is:

1. A rotation mixing faucet insertion piece developed as a control unit with ceramic insertion and operated by single-grip turning, the control unit having a base on one side, and on another side being connected to an operating arm, the control unit comprising:
    a fixed stationary inlet disc, the inlet disc including at least one inlet port for hot water, at least one inlet port for cold water, a first outlet port, and a second outlet port adjacent the first outlet port; and
    a rotatable control disc that is rotatably connected to the inlet disc so that the control disc can rotate relative to the inlet disc, one face of each of the discs being arranged one above another to form a plane seal, an opposite face of the inlet disc being connected to the base and an opposite face of the control disc being connected to the operating arm such that rotation of the operating arm rotates the control disc relative to the inlet disc, the rotatable control disc including a first mixing space for supplying fluid to a bath tub, and a second mixing space for supplying fluid to a shower;
    wherein the operating arm rotates about a longitudinal axis and is incapable of moving in other degrees of freedom, to adjust and independently control the relationship between the first and second outlet ports of the fixed stationary inlet disc and the first and second mixing spaces of the rotatable control disc, to adjust water temperature and to switch operation between the first and second outlet ports, without controlling the quantity of water flow, except when initially opening and closing the first and second outlet ports and switching operation between the first and second outlet ports, by rotating the control disc relative to the inlet disc in a single degree of freedom only, so that water can only flow out of one of the outlet openings at a time depending on the position of the operating arm.

2. The mixing faucet insertion according to claim 1, wherein during operation of the first outlet port, turning the operating arm clockwise by an angle of $\beta$ adjusts a proportion of the cold and hot water to control the temperature of the water flowing out of the first outlet port.

3. The mixing faucet insertion according to claim 2, wherein the first outlet port is for bathtub filling and the second outlet port is for shower operation.

4. The mixing faucet insertion according to claim 1, wherein during operation of second outlet port, turning operating arm anti-clockwise by an angle of $\delta$ adjusts a proportion of the cold and hot water to control the temperature of the water flowing out of the second outlet port.

5. The mixing faucet insertion according to claim 4, wherein the first outlet port is for bathtub filling and the second outlet port is for shower operation.

6. The mixing faucet insertion according to claim 1 characterized in that one of the outlets is for bathtub filling, the other one for the shower function.

* * * * *